United States Patent [19]

Pippin et al.

[11] Patent Number: 4,627,189
[45] Date of Patent: Dec. 9, 1986

[54] PORTABLE LIVE WELL

[76] Inventors: Harold G. Pippin; Hilma M. Pippin, both of R.R. 1, Box 97A, Brighton, Mo. 65617

[21] Appl. No.: 747,804

[22] Filed: Jun. 24, 1985

[51] Int. Cl.[4] ............................................. A01K 97/04
[52] U.S. Cl. ......................................................... 43/55
[58] Field of Search .......................... 43/56, 55, 54.1; 114/364, 123, 126, 198, 61; 224/920, 921, 922; 119/3

[56] References Cited

U.S. PATENT DOCUMENTS

| | | | |
|---|---|---|---|
| 359,311 | 3/1887 | Bateman | 43/56 |
| 404,132 | 5/1889 | Travis | 114/198 |
| 1,719,591 | 7/1929 | Collins | 43/55 |
| 2,564,598 | 8/1951 | Grimshaw | 43/56 |
| 2,765,577 | 10/1956 | Scruggs | 43/55 |
| 2,794,191 | 6/1957 | Gaskovitz | 114/364 |
| 2,834,138 | 5/1958 | Pedersen | 43/55 |
| 3,085,534 | 4/1963 | Rabinow | 114/123 |
| 3,148,476 | 9/1964 | Ethridge | 43/55 |
| 3,304,645 | 2/1967 | Hardesty | 119/3 |

Primary Examiner—Nicholas P. Godici
Assistant Examiner—G. M. Reid
Attorney, Agent, or Firm—Gravely, Lieder & Woodruff

[57] ABSTRACT

A live well for keeping fish and bait alive includes compartmented hull that may be attached to the gunwale of a boat through swing arms which enable the hull to be positioned in the boat or to the side of the boat where it may be either in or out of the water. The hull contains ports which enable water to flow into the hull and to circulate through its compartments, thus sustaining fish and bait in those compartments. At each port is a valve for closing the port, and this enables water to be trapped in the compartments when the hull is out of the water. The valves are controlled from the exterior of the hull. Moreover, the hull may be detached from its swing arms, so that it and the fish or bait in it may be easily carried from one place to another.

22 Claims, 7 Drawing Figures

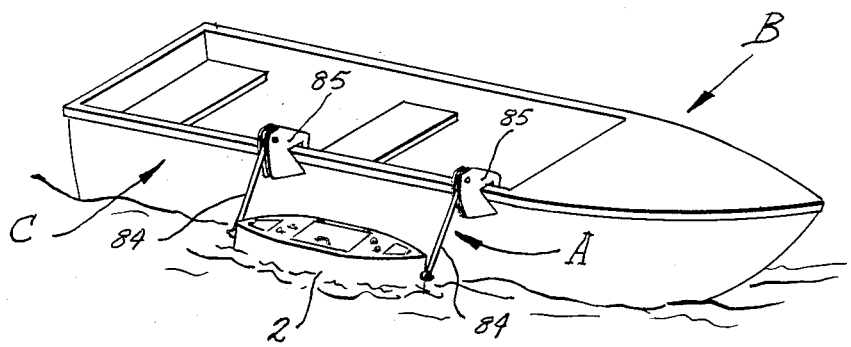
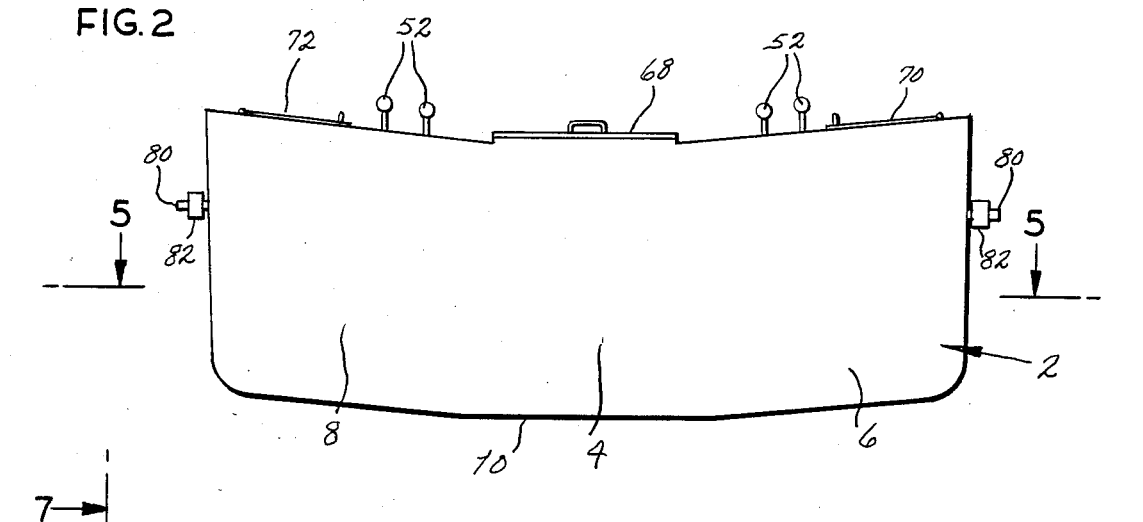
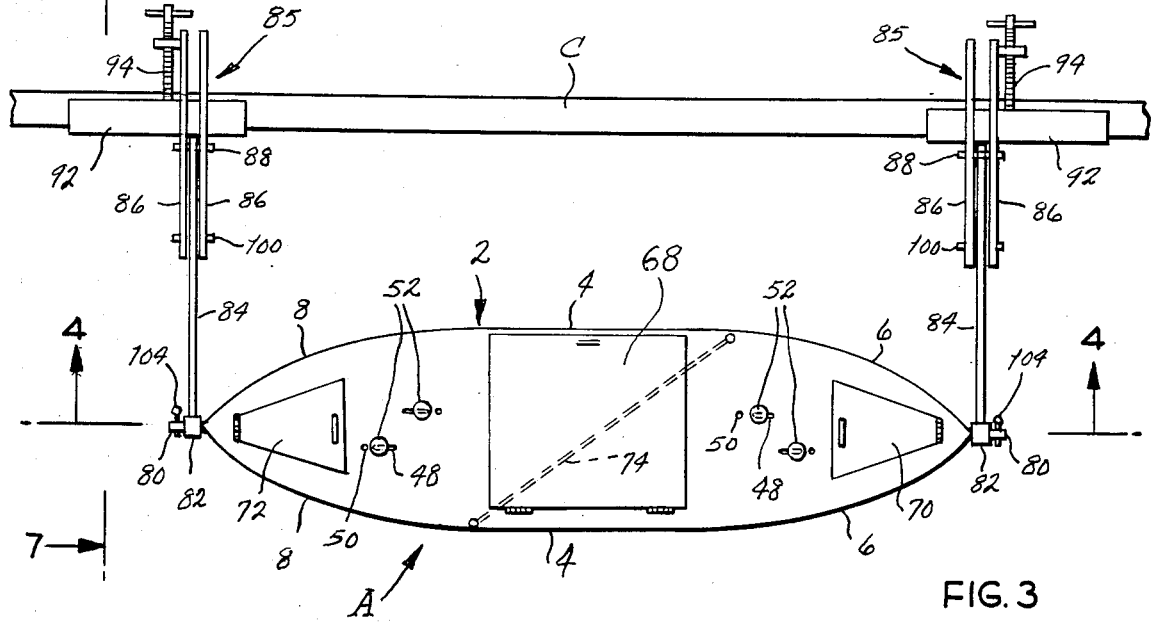

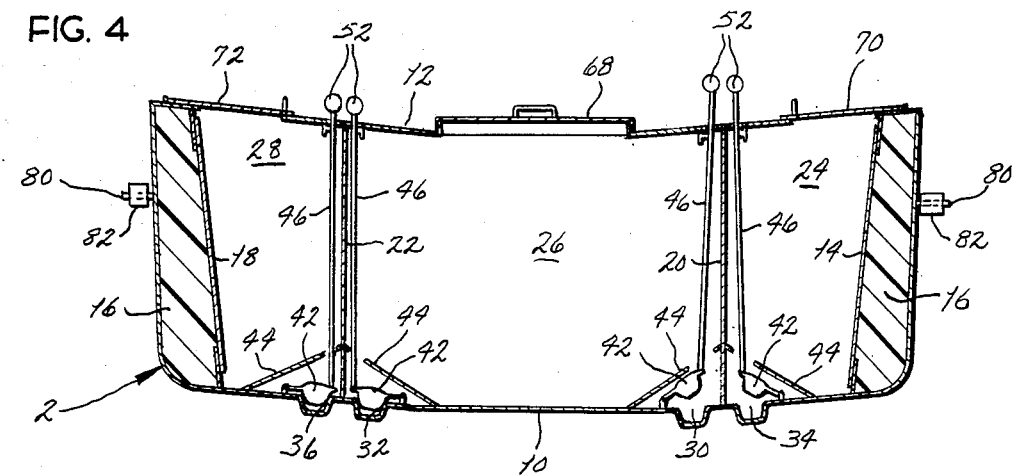
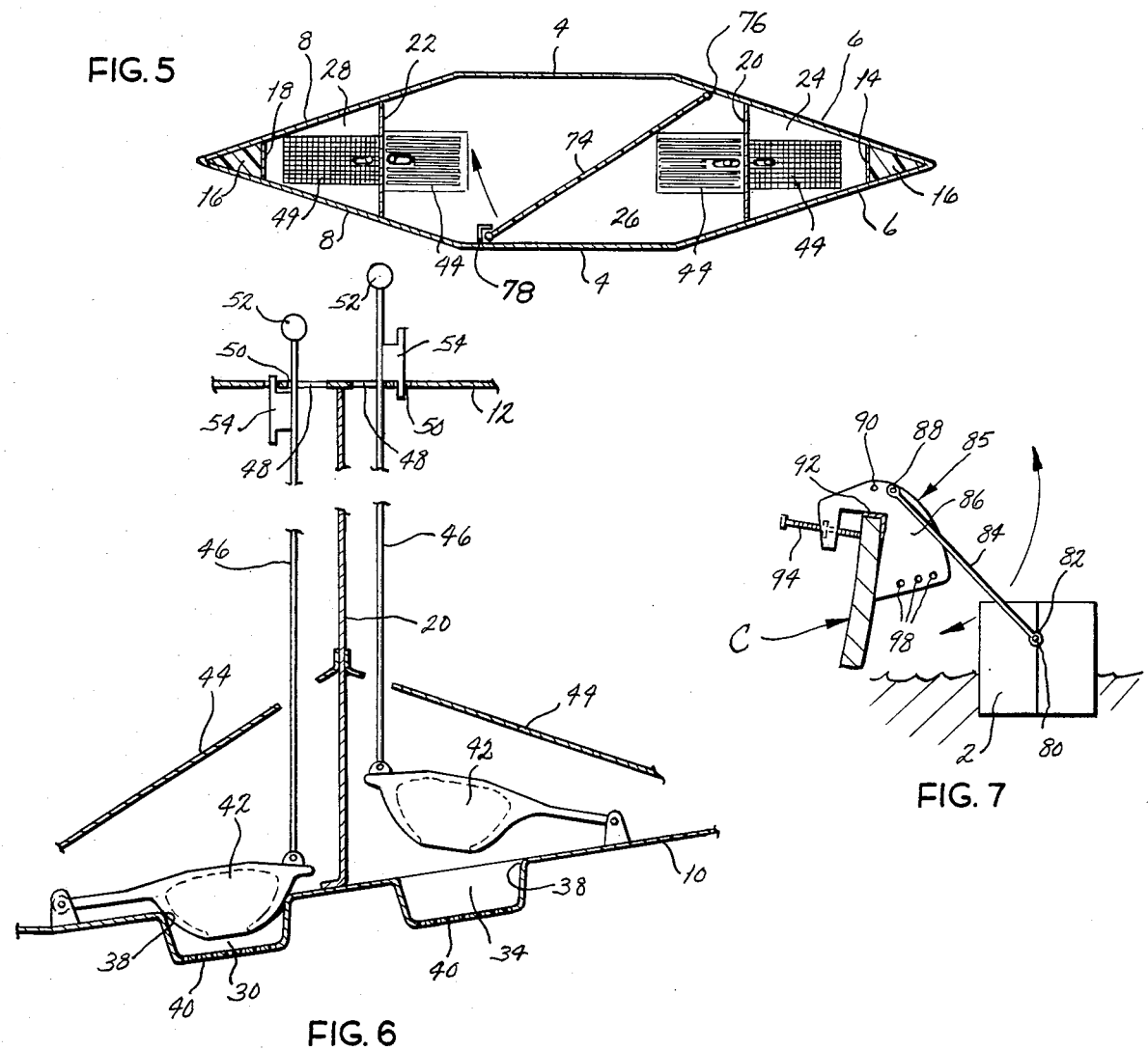

PORTABLE LIVE WELL

BACKGROUND OF THE INVENTION

This invention relates in general to fishing and more particularly to a live well for holding fish and bait.

Those who participate in the sport of fishing desire to keep their catches alive as long as possible so as to have fresh fish for whatever meals derive from their efforts. One very basic device for achieving this end is the simple stringer, which is nothing more than a small rope that is passed through the mouth and out one of the gills of each fish which is to be retained. Once a stringer is emplaced, the fish retained by it are placed back in the water where they will most likely survive, yet cannot swim away.

Even so, the trauma of the catch coupled with the placement of a stringer is on occasion so stressful that some fish do not survive. Some fish furthermore struggle to become free of the stringer and are fatally injured by those efforts. Moreover, the stringer renders the fish more or less immobile, so they cannot escape predators such as turtles.

Many fisherman prefer to keep their catches in so-called live wells. In this regard, some fishing boats are provided with tanks built into their hulls for holding fish, but these tanks add considerably to the cost of the boats in which they are located and require auxiliary appliances such as air pumps to aerate the water within them and water pumps to elevate water into them. Moreover, these tanks occupy considerable space irrespective of whether or not they are in use. Some are also quite difficult to fill and drain. Aside from that they have no provision for separating the catches of different fishermen which is desirable in many instances and mandatory in some states. They also have no provisions for separating the fish from bait such as minnows. Indeed, such bait must be kept in a separate container such as a minnow bucket.

SUMMARY OF THE INVENTION

One of the principal objects of the present invention is to provide a live well that mounts upon or connects with a boat or other structure, such as a dock, yet does not form an integral part of the boat or other structure. Another object is to provide a live well of the type stated which is easily moved from a position within the boat to a position overhanging the gunwale of the boat where it may be in the water to the side of the boat. A further object is to provide a live well of the type stated which may be detached from a boat or other anchoring structure and carried about. An additional object is to provide a live well of the type stated which has internal compartments for separating the catches of different fishermen. Still another object is to provide a live well of the type stated that is capable of holding small fish that are used as bait as well as holding a catch of fish itself. Yet another object is to provide a live well having compartments which are easily filled and drained. These and other objects and advantages will become apparent hereinafter.

DESCRIPTION OF THE DRAWINGS

In the accompanying drawings which form part of the specification and wherein like numerals and letters refer to like parts wherever they occur.

FIG. 1 is a perspective view of a fishing boat to which is attached a portable live well constructed in accordance with and embodying the present invention;

FIG. 2 is a side elevational view of the live well;

FIG. 3 is a plan view of the live well extended outwardly from the gunwale of the fishing boat;

FIG. 4 is a sectional view of the hull for the live well taken along line 4—4 of FIG. 3;

FIG. 5 is a sectional view of the hull taken along line 5—5 of FIG. 2;

FIG. 6 is an enlarged sectional view showing the valves in the bottom wall and front partition wall of the hull; and FIG. 7 is an end view of the live well taken along line 7—7 of FIG. 3 and showing the hull in water to the side of the boat on which the live well is mounted.

DETAILED DESCRIPTION

Referring now to the drawings, a live well A (FIG. 1) may be carried separately or attached to a fishing boat B on the gunwale C of that boat or to some other anchoring structure such as a dock beside a body of water. When so attached, the live well A may be positioned either in or out of the water, and when in the water, the water may circulate freely through it to keep bait and fish within it alive.

The live well A includes a hull 2 (FIGS. 2-5) which is shaped much like the hull of a small boat, in that it has upright sides that converge at both ends to enable the hull 2 to slice easily through the water in either direction. More specifically, the hull 2 has a pair of spaced apart side walls 4 which are generally parallel and merge into converging front walls 6 and converging rear walls 8. The front walls 6 come together to form the front edge of the hull 2, and likewise the rear walls come together to form the rear edge of the hull 2. The side, front and rear walls 4, 6 and 8 furthermore merge into a bottom wall 10 which forms the bottom of the hull 2. Along their upper edges the walls 4, 6 and 8 are attached to a top wall 12. The hull 2 may be molded or vacuum formed from a polymer, such as any of the common plastics.

At the front of the hull 2 a cross wall 14 (FIGS. 4 & 5) spans the converging front walls 4 to isolate a compartment which contains a floatation material 16. Similarly at the rear of the hull 2 another cross wall 18 spans the converging rear walls 6 to isolate another compartment that contains more floatation material 16. The floatation material 16, which may be an expanded polymer of the closed cell variety, possess enough bouyancy to maintain the hull 2 afloat even when the hull 2 is otherwise completely filled with water.

Somewhat ahead of the two parallel side walls 4 the converging front walls 6 are connected by a front partition wall 20 (FIGS. 4 & 5), and likewise somewhat behind the side walls 4, the converging rear walls 8 are connected by a rear partition wall 22. The two partition walls 20 and 22 are attached and sealed to the converging walls 6 and 8, respectively, and likewise to the top and bottom walls 10 and 12, to thus divide the interior of the hull 2 into three watertight compartments, namely a front compartment 24, a center or middle compartment 26, and a rear compartment 28.

The bottom wall 10 contains two ports 30 and 32 (FIG. 4) which open into the center compartment 26, the one being located adjacent to the first partition wall 20 and the other adjacent to the rear partition wall 22. In addition, the bottom wall 10 has another port 34 which opens into the front compartment 24 and still another port 36 which opens into the rear compartment 28. Each port 34 is surrounded by an annular valve seat 38 which is presented upwardly. Each port 34 also has a screen 40 extended across its lower end to prevent objects from entering the port 34 from below. The ports 30 and 34 are located adjacent to the front partition wall 20 which extends between them, whereas the ports 32 and 36 are located adjacent and separated by the rear partition wall 22.

Furthermore, at each port 30 and 32 is a flapper-type valve 42 which is hinged relative to the valve seat 38 at that port so as to swing downwardly toward and upwardly away from the valve seat 38. The valves 42 cooperate with the valve seats 38 to either close or open the ports 30, 32, 34, and 36 surrounded by those seats. Of course, when the valves 42 for the port 30 and 32 are closed, the center compartment 26 will hold water in which fish may be sustained. Similarly, when the valve 42 for the port 34 is closed, the front compartment 24 will hold water, and when the valve 42 for the port 36 is closed, the rear compartment 28 will hold water, so that bait may be sustained in either one of those compartments.

Each flapper valve 42 is formed from an elastomeric material and is hinged with respect to the hull 2 adjacent to its seat 33, with the hinge axes of the valve 34 being on the side of the seat 33 that is away from the particular partition wall 20 or 22 along which the seat 38 lies. Each flapper valve 42 further includes a pilot portion which projects into the port 30 or 32 for that valve when the valve 42 is closed, and indeed in that condition the valve 42 seals against the valve seat 38 to prevent the water from passing out of the particular port 30, 32, 34 or 36 at which it is located. Of course, when the valve 42 is open, it is elevated with respect to its valve seat 38 and water will flow through the port 30, 32, 34 or 36 with which it is associated, either into or out of the compartment into which the port opens.

Each flapper valve 42 is isolated from the compartment 24, 26 or 28 in which it is located by a grid 44 which extends obliquely between the bottom wall 10 and the partition wall 20 or 22 adjacent to which that flapper valve 42 is located. The grid 44 for any valve 42 has its greatest elevation—at the partition wall 20 or 22 to which it is connected—and this is over the free end of the underlying flapper valve 42 with the grid 42 sloping downwardly from there to the bottom wall 10. This provides ample space to enable the flapper valve 42 to be lifted upwardly off of its seat and thus open the port 30, 32, 34 or 36 with which it is associated. The openings in the two grids 44 in the center compartment 26 must be small enough to prevent fish in that compartment from contacting the underlying valves 42 and valve seats 40. Likewise, the grids 44 in the front and rear compartments 24 and 28 must be small enough to prevent bait in those compartments from interfering with the underlying valves 42 or entering the ports 34 and 36 which they are designed to close.

Each flapper valve 42 is operated from the exterior of the hull 2, that is from above the top wall 12, but a control rod 46 which is pivotally connected to the free end of the valve 42, which is the end remote from the hinge axis for the valve 42, and extends upwardly from there, passing through the overlying grid 44 and the top wall 12 as well. Indeed, above each flapper valve 42, the top wall 12 is provided with an elongated aperture 48 and adjacent to one end of that aperture, a smaller aperture 50. The control rod 46 extends through the elongated aperture 48 and beyond it is provided with a knob 52 which is always accessible from the exterior of the hull 2 and is too large to pass through the aperture 48. Slightly below the knob 52, the control rod has a double hook 54 which projects both upwardly and downwardly from its shank where it attaches to the rod 46. While the hook 54 is small enough to pass through the elongated aperture 48, it is nevertheless long enough to reach the other aperture 50, either above or below the top wall 12.

When the double hook 54 is above the top wall 12, one of its prongs will fit into the aperture 50, and enable the hook 54 to engage the top wall 12. The length of the control rod 46 is such that it, with its hook 54 being so engaged, holds the flapper valve 42 to which it is connected away from the seat 38 for that valve. On the other hand, when the hook 54 is beneath the wall 12, its other pring may be projected into the aperture 50. In this condition the valve 42 is against its seat 38, and indeed the rod 46 may even force it tightly against the seat 38. Irrespective of whether or not the engaged hook 54 acting through the rod 46 forces the flapper valve 42 against its seat 38, the weight of water trapped in any compartment 24, 26 or 28 is enough to hold the flapper valve 42 for that compartment against its seat 38

The top wall 12 above the center compartment 26 has a relatively large opening which is normally covered by an access door 68 (FIG. 3) that is hinged to the top wall 12. Of course, when the door 68 is open, one can gain access to the center compartment 26. Likewise, the top wall 12 has an opening above the first compartment 24 and another above the rear compartment 28, and these openings are closed by access doors 70 and 72, respectively. Thus, access to the front and rear compartments 24 and 28 is available through the top wall 12.

The center compartment contains a divider grid 74 (FIG. 5) which at its one end is connected to one of the converging rear walls through a hinge 76. This enables the divider grid 74 to swing to an out-of-the way position, in which it lies along one of the side walls 4, and a separating position in which it extends diagonally through the compartment 26 so as to divide the compartment 26 into two separate sections. The divider grid 74 is held in its separating position by a catch 78 which connects its free end to the opposite side wall 4, that is the side wall 4 which is located opposite to the side wall 4 to which the hinge 76 is attached When the grid 74 is in its separating position, both of the sections into which it divides the compartment 26 are accessible through the opening that is normally covered by the door 68 on the top wall 12.

The hull 2 along the edge formed by the converging front walls 6 and likewise along the edge formed by the converging rear walls 8 is provided with trunnions 80 (FIG. 3) which project forwardly and rearwardly from the hull 2 and lie along the same axis. Each trunnion 80 is received in a bushing 82 at the end of a swing arm 84, and each swing arm 84 at its opposite end is connected to bracket means in the form of a mount 85 which includes a pair of guide plates 86. Indeed, the swing arm 84 for each mount 85 fits between the two guide plates 86 where it pivots about a hinge pin 88 that spans the space between the plates 86. Actually the plates 86 possess a somewhat arcuate configuration and near their upper edges are provided with a series of aligned holes 90 (FIG. 7). The pin 88 is adapted to fit into and be retained by any one of a pair of aligned holes 90. Directly beneath the holes 90 the plates are attached to a bracket 92 which is configured to fit over the gunwale C, resting on the top surface of the gunwale C and also extending along the adjacent portion of the outside face on the gunwale C. As a consequence, portions of the two plates 86 project both inwardly and outwardly past the gunwale C. Secured to the inwardly projecting portions is a tab through which a clamp screw 94 is threaded, and the screw 94 when turned moves toward and away from the bracket 92. Thus, when the bracket 92 is over the gunwale C, and the screw 94 is turned down against the gunwale C, the bracket 92 and the plate 86 are anchored firmly to the gunwale C. At their outer ends the plates 86 are somewhat wider, and here they are provided with another set of aligned holes 98 (FIG. 7) which are likewise arranged in pairs. The holes 98 are designed to receive a stop pin 100 (FIG. 3) which limits rotation of the swing arm 84 in the opposite direction. The particular pair of holes 98 in which the stop pin 100 is located determines the angle at which the swing arm 84 stops on the outside of the gunwale C.

Thus, the hull 2 may be moved on the swing arms 84 from a stored position inside of the boat, that is with the swing arms 84 projecting inwardly from the gunwale C over center to an outside position in which the hull 2 either floats in the water or is suspended by the swing arms 84 with the swing arms 84 in turn being against the stop pins 100. The position of the hull 2 when it is to the outside of the gunwale C may to a measure be controlled, and the control is achieved by selecting different pairs of holes 90 for the hinge pins 88, and also different pairs of holes 98 for the stop pins 100. On the one hand, the hull 2 may be allowed to float in the water to the side of the boat, in which case its own bouyancy or the bouyancy of its floatation material 16 will keep it afloat. On the other hand, the hull 2 may be suspended above the water, or suspended in the water with its hull 2 elevated above the position normally assumed through bouyancy, this being achieved when the swing arms 84 rest on their respective stop pins 100.

To provide even greater versatility, the swing arms 84 may be constructed to telescope.

The bushings 82 are held on the trunnions 80 by small cross pins 104 (FIG. 3) which pass transversely through the ends of the pins 102. However, the pins 102 are easily removed so that the hull 2 may be detached from the swing arms 84 and carried overland. Also, the hull 2 may, absent the swing arms 84, be placed in the water and tied to a dock with a rope that is also tied to one of the trunnions 80.

OPERATION

The live well A sustains both bait and any fish which may be caught with that bait. Normally, the bait is minnows which are kept alive in the two end compartments 24 and 28 of the hull 2. One's catch of fish is placed in the center compartment 26. While the live well A is designed primarily for use on the gunwale C of a small boat B, it is in a broader sense portable and may be carried about with the fish and bait in it. It also may be attached to a dock, in that it is easily moved from one location and is adapted to be attached to structures other than boat gunwales.

To use the live well A on the small boat B, the brackets 92 are clamped to one of the gunwales C of the boat B with the clamp screws 94. When so attached, the hull 2 may be located either inside or outside the boat B, and when in the latter position, it may be either in the water or suspended above the water. Normally, it is kept in the water outside of the boat B with the flapper valves 42 open. This permits water to enter the center compartments 24, 26 and 28 through the ports 30, 32, 34, and 36 with which those valves are associated. The floatation material 16 at the very front and rear of the hull 2 keeps the hull 2 afloat without imposing excessive stress on the swing arms 84. Generally speaking, only enough floatation material 16 should be present to allow the hull 2 to be about one-half filled with water. Thus, minnows or other live bait may be placed in the front and rear compartments 24 and 28 merely by lifting the doors 70 and 72 that cover those compartments. The grids 44 located at the flapper valves 42 for the compartments 24 and 28 prevent the bait from leaving through the ports 34 and 36.

Fish that are caught are placed in the center compartment 26 merely by lifting the door 68 on the top wall 12 and dropping them into the water in that compartment. If two fishermen wish to keep their respective catches separate, the divider grid 74 is swung outwardly away from one of the side walls 4 to its separating position and secured with the catch 78 to the other side wall 4. As such it extends diagonally through the center compartment 26 and in effect divides that compartment into two separate or subcompartments. Both subcompartments are exposed through the opening that is normally covered by the access door 68. The grids 44 at the bottom of the center compartment 26 prevent the fish from interferring the valves over the front and rear ports 30 and 32, yet allow water to circulate through the compartment 26 to provide a constant stream of fresh water that sustains the fish in the compartment 26. Indeed, the fresh water may flow into the compartment 26 through one of the ports 30 or 32 and out through the other.

The hull 2 protects both the fish of the catch and the bait from predators such as other fish or turtles. It also subjects the fish to less stress and injury than the traditional fish stringer. Indeed, the center compartment 26 is quite dark, and the fish within it think they are hidden deep beneath rocks.

When the fisherman desires to move his boat B from one location to another, he may do so with the hull 2 of the live well A in the water, provided the boat speed is maintained relatively low. However, when the boat is operated at higher speeds, the hull 2 should either be brought into the boat B or should be suspended above the water outside the boat C. To do so, the fisherman moves the control rods 46 for the two flapper valves 42 such that the valves 42 are allowed to drop to their respective seats 38. Indeed, the double hooks 54 fro the control rods 46 may be engaged with the top wall 12 beneath that wall. Then the hull 2 is lifted upwardly to the desired position out of the water, and when it is the weight of the water trapped within the compartments 24, 26 and 28 forces the valves 42 for those compartments against their respective seats 38 and effectively closes the ports 30, 32, 34, and 36.

When the hull 2 is brought inside the boat C, the swing arms 84 swing over center and either the hull 2 comes to rest on a seat or the floor of the boat B. On the other hand, the hull 2 may be suspended from the swing arms 84 outside of the boat B, in which case the swing arms 84 rest on the stop pins 100.

Similarly, the live well may be detached from its swing arms 84 and brackets 90 and carried about to transport the fish catch and bait from one place to another while keeping it alive, although when this occurs care should be taken to either areate the water or place the hull 2 of the live well A back in a body of fresh water within a short time, lest the fish and bait will die from suffocation. Assuming the hull 2 is placed back in the water, each of the control rods 42 should at its double hook 54 be disengaged from the top wall 12 and lifted upwardly to bring the hook 54 through the elongated aperture 48 through which the rod 46 extends. The hook 54 is then reengaged with the top wall on the upper surface of that wall. As a consequence, the rods 46 hold the valves 42 open, and this permits fresh water to pass through the ports 30, 32, 34, and 36 and circulate through the compartments 24, 26 and 28. The hull 2, when placed in the water, to sustain fish in the compartment 26 and bait in the compartments 24 and 28, need not be secured with the swing arms 84 and mounts 85, but instead may be attached to a dock or even to a boat merely with a rope that is tied to the dock or boat and to one of the trunnions 80 on the hull 2.

When the hull 2 is transported overland, not all of the compartments 24, 26 and 28 need contain water. For example, if only bait is to be transported, then the valves 42 at the bottom of one or both end compartments 24 and 28 are closed and the compartments 24 and 28 are filled with water. The bait is placed in the filled compartment 24 or compartments 24 and 28. On the other hand, if only the fish are to be transported, the valves 42 for the end compartments 24 and 28 are left open, but the valves 42 for the center compartment 26 are closed and the compartment is filled with water. The fish catch is placed within the water of that compartment.

While the hull 2 of the live well A which has heretofore been considered has three compartments 24, 26 and 28, each with its own valve 42, it may have more or less compartments. Indeed, it may have only one compartment.

In lieu of the flapper valves 42, the ports 30, 32, 34 and 36 may be opened and closed by ball type valves or valves of other configurations which seat against the valve seats 38.

This invention is intended to cover all changes and modifications of the example of the invention herein chosen for purposes of the disclosure which do not constitute departures from the spirit and scope of the invention.

What is claimed is:

1. A live well apparatus comprising: a hull adapted for placement in a body of water and having spaced apart upright ends and at least one interior compartment for holding water and fish within the water, the hull having at least one port for providing communication between the compartment and the exterior of the hull and being located such that when the hull is in an upright orientation in the body of water, water may enter the compartment through the port; a valve located at the port for closing the port; bracket means configured and adapted to be attached firmly to the gunwale of a small boat; swing arms pivotally connected to the hull at the ends of the hull and to the bracket means to enable the hull to be moved in the upright orientation between an outside position, wherein it is located outside of the boat to the side of the gunwale, and a stored position, wherein it is located generally within the boat, the swing arms rotating and passing through an upright position as the hull moves between its outside and stored positions.

2. A live well apparatus according to claim 1 where the hull has a top and a bottom; and wherein the swing arms are connected to the ends of the hull at trunnions which are located closer to the top of the hull than the bottom of the hull.

3. A live well apparatus according according to claim 2 wherein the hull at each of its ends converges to an edge that is capable of slicing through water, and the trunnions extend from the edges.

4. A live well apparatus according to claim 1 wherein the hull has a trunnion projecting from each of its ends, and the swing arms pivot on the trunnions.

5. A live well apparatus according to claim 1 and further comprising means in the hull for keeping the hull afloat when its compartment is flooded with water.

6. A live well apparatus according to claim 1 wherein the hull contains a partition wall which divides the interior of the hull into at least first and second compartments; and wherein the port opens from the first compartment to the outside of the hull, and another port opens from the second compartment to the outside of the hull; and further comprising another valve for closing the other port.

7. A live well apparatus according to claim 6 and further comprising control means for opening and closing the valves, the control means being accessible from the exterior of the hull.

8. A live well apparatus according to claim 6 and further comprising means within the hull for keeping the hull afloat when its compartments are flooded with water.

9. A live well comprising: a hull adapted for placement in a body of water and having walls including upright side walls which are spaced apart, a bottom wall, and a top wall, all of which serve to enclose at least one compartment within the hull; a port in one of the walls of the hull for providing communication between the compartment and the exterior of the hull such that water may enter the compartment when the hull is in a body of water, the top wall having an opening which provides access to the compartment; a valve at the port for opening and closing the port; control means accessible from the exterior of the hull for operating the valve; and a substantially planar divider located in a verticle orientation within the compartment and being movable therein between an out-of-the-way position, wherein it is fastened within and does not substantially obstruct the compartment, and a separating position, wherein it extends between two of the walls that enclose the compartment and divides the compartment into two sections, both of which open upwardly and are accessible from the opening in the top wall and means for fastening the divider to the two walls between which it extends when the divider is in its separating positions.

10. A live well according to claim 9 wherein the divider is located against one of the side walls when in its out-of-the-way position.

11. A live well according to claim 9 wherein the divider extends diagonally across the compartment from one side wall to the other when in its separating position.

12. A live well according to claim 11 wherein the divider is hinged to one of the side walls and is located along that side wall when in its out-of-the-way position.

13. A live well according to claim 9 wherein the divider is perforated so that water may circulate though it and between the sections that it separates.

14. A live well according to claim 9 wherein the side walls of the hull converge at both ends of the hull.

15. A live well comprising: a hull adapted for placement in a body of water and having upright side walls which are spaced apart, a bottom wall, and a top wall, all of which cooperate to enclose at least one compartment within the hull; a first port in the bottom wall to provide communication between the compartment and the exterior of the hull so that water from the body of water may circulate through the port and the compartment; a first valve at the first port for opening and closing the first port; and a first control member extending from the first valve to the top wall where it is accessible for manual manipulation and being engageble with the top wall for holding the first valve in either an open position or closed position with respect to the first port, the control member when holding the valve in its closed position exterting a downwardly directed force on the valve to maintain the first valve in its closed position with respect to the first port.

16. A live well according to claim 15 wherein the compartment has opposite ends; wherein the first port and first valve are at one end of the compartment; wherein a second port is in the bottom wall at the other end of the compartment; wherein a second valve is at the second port for opening and closing the second port; and wherein a second control member extends from the second valve to the top wall where it is accessible for manual manipulation and where it is engageable with the top wall for holding the second valve in either an open position or a closed position with respect to the second port, the second control member when holding the second valve in its closed position exerting a downwardly directed force on the second valve to maintain the second valve in its closed position with respect to the second port.

17. A live well according to claim 15 and further comprising a grid located within the compartment and extending over the first port and first valve to isolate the first port and first valve from the remainder of the compartment.

18. A live well according to claim 15 wherein the upright walls of the hull converge at the ends of the hull.

19. A live well according to claim 16 wherein each port is surrounded by a valve seat, and the first and second valves pivot at the sides of their respective seats and bear against the respective seats along the full perimeter of their respective ports when they are closed.

20. A live well according to claim 15 and further comprising a divider located in the first compartment and hinged to one of the upright side walls of the hull, the divider being capable of swinging through the first compartment between an out-of-the-way position along the upright side wall to which it is hinged and a separating position in which it extends diagonally through the first compartment and divides it into two sections.

21. A live well according to claim 20 wherein the top wall has an opening which is large enough and positioned such that it provides access to the two sections separated by the divider when the divider is in its separating position, and a door for covering the opening.

22. A live well according to claim 15 and further comprising means on the hull for keeping it afloat when its compartment is flooded with water.

* * * * *